United States Patent Office.

FRIEDRICH KRECKE AND IGNAZ ROSENBERG, OF BIEBRICH, GERMANY, ASSIGNORS TO KALLE & CO., OF SAME PLACE.

GREENISH-BLUE TETRAZO DYE.

SPECIFICATION forming part of Letters Patent No. 563,386, dated July 7, 1896.

Application filed December 30, 1895. Serial No. 573,816. (Specimens.) Patented in England January 9, 1894, No. 515.

*To all whom it may concern:*

Be it known that we, FRIEDRICH KRECKE and IGNAZ ROSENBERG, doctors of philosophy, residing at Biebrich-on-the-Rhine, Germany, have invented new and useful Improvements in the Manufacture of Azo Dyestuffs, (for which we have obtained Letters Patent in England, No. 515, dated January 9, 1894,) of which the following is a specification.

This invention relates to the manufacture of a series of new tetrazo colors made either by combining one molecule of a tetrazo body with one molecule of 1.8.4.6. amidonaphtholdisulfo-acid, called "K" acid, in acid or alkaline solution, and acting on the so-formed intermediate diazo azo body with an aromatic amin or phenol or sulfo or carbo acids thereof, or by acting with one molecule of 1.8.4.6 amidonaphtholdisulfo-acid in alkaline solution on the intermediate combinations of molecular proportions of a tetrazo body with an aromatic amin or a phenol or sulfo or carbo acids of the same, both of which processes we consider equivalents of each other within this invention.

In order to carry out our invention, we proceed, for instance, as follows: Thirty-two kilos of dianisidin hydrochlorate are diazotized in aqueous solution by addition of twenty-four kilos of hydrochloric acid of 20° Baumé and fourteen kilos of nitrite of sodium. This solution is stirred into a solution of thirty-four kilos acid sodium salt of 1.8.4.6. amidonaphtholdisulfo-acid and twenty kilos of soda-ash in one thousand liters of water. The formation of the intermediate body is soon finished. A solution of thirty-four kilos acid sodium salt of 1.8.3.6 amidonaphtholdisulfo-acid and ten kilos of soda-ash is now added and the mixture stirred for twenty-four hours. The formation of the the new tetrazo color is then finished. It is salted out, pressed, and dried. It forms a crystalline bronzy powder, soluble in water, almost insoluble in alcohol, and dyes a bright greenish-blue on unmordanted cotton. The color made by acting with one molecule of K acid on the intermediate combination of molecular proportions of tetrazo-diphenyl and 1.4. naphtholsulfo-acid dyes a bright bluish violet on unmordanted cotton. The colors of this series of tetrazo colors can be diazotized again in solution or on the textile fiber and combined with aromatic amins or phenols. If for instance the color made by combining diazodiphenylazo salicylic acid with K acid is diazotized again and combined with meta toluylendiamin, a brown cotton color is obtained.

We have made application for the K acid herein referred to on the 30th day of December, 1895, Serial No. 573,812.

What we claim is—

1. The process herein described of producing tetrazo dyestuffs which consists in combining one molecule of 1.8.4.6 amidonaphtholdisulfo-acid with one molecule of a tetrazo body, and acting on the so-formed intermediate diazo azo body with an aromatic amin or phenol of the kind ordinarily employed in color manufacture, or sulfo or carbo acids thereof, substantially as described.

2. As a new product the tetrazo dyestuff, which may be made by combining one molecule of tetrazodimethoxydiphenyl with one molecule of 1.8.4.6. amidonaphtholdisulfo-acid and one molecule of 1.8.3.6 amidonaphtholdisulfo-acid, substantially as described and which forms a bronzy crystalline powder, easily soluble in water almost insoluble in alcohol, dyeing a bright greenish-blue on unmordanted cotton.

In testimony whereof we have signed our names to this specification in the presence of two subscribing witnesses.

FRIEDRICH KRECKE.
IGNAZ ROSENBERG.

Witnesses:
ROBERT DORFELDER,
CARL ED. HAHN.